United States Patent [19]

Mihara

[11] 4,443,069
[45] * Apr. 17, 1984

[54] COMPACT CAMERA LENS SYSTEM WITH A SHORT OVERALL LENGTH

[75] Inventor: Shin-ichi Mihara, Hachiouji, Japan

[73] Assignee: Olympus Optical Co., Ltd., Tokyo, Japan

[*] Notice: The portion of the term of this patent subsequent to Nov. 16, 1999 has been disclaimed.

[21] Appl. No.: 368,092

[22] Filed: Apr. 13, 1982

[30] Foreign Application Priority Data

Apr. 15, 1981 [JP] Japan .................................. 56-56795

[51] Int. Cl.³ .......................... G02B 9/16; G02B 9/34
[52] U.S. Cl. .................................. 350/469; 350/432
[58] Field of Search .............................. 350/469, 432

[56] References Cited

U.S. PATENT DOCUMENTS

| | | | |
|---|---|---|---|
| 4,035,063 | 7/1977 | Ikeda . | |
| 4,359,271 | 11/1982 | Mihara | 350/469 |
| 4,368,956 | 1/1983 | Yamada et al. | 350/469 |

*Primary Examiner*—John K. Corbin
*Assistant Examiner*—Paul M. Dzierzynski
*Attorney, Agent, or Firm*—Cushman, Darby & Cushman

[57] ABSTRACT

A compact camera lens system with a short overall length comprising a first positive meniscus lens component having the convex surface on the object side, a second biconcave lens component, a third biconvex lens component and a fourth negative meniscus lens component. This lens system has a field angle of view of or more than 60° and an F-number of 4.0.

7 Claims, 7 Drawing Figures

COMPACT CAMERA LENS SYSTEM WITH A SHORT OVERALL LENGTH

BACKGROUND OF THE INVENTION (a) Field of the Invention

This invention relates to lens systems for cameras using Leica size films and more particularly to a compact camera lens system of a field angle of view of or more than 60 degrees, F-number of 4.0 and short overall length.

(b) Description of the Prior Art

A lens system for compact cameras using Leica size films is generally selected to have a field angle of view around 63 degrees. In order to make a lens system of this class so compact as to be of a telephoto ratio of or less than 1.0, it is necessary that the rear side principal point position of the lens system should be before the first surface of the lens system. In order to make so, it is considered to adopt a lens type used generally in a telephoto type lens system in which the front lens group is of a convergent lens system and the rear lens group is of a divergent lens system. However, generally in a telephoto type lens system, the field angle of view required to retain a favorable performance is so narrow as to be much smaller than the above described 63 degrees.

In order to form a lens system for the object of the present invention, it is necessary to well correct the aberrations to a field angle of view of 63 degrees, that is to say, it is important to correct the off-axial aberrations.

There is a lens system of U.S. patent application Ser. No. 197,743 filed on Oct. 16, 1980 (which shall be known as the invention of the prior application hereinafter) filed by Suzuki et al as a lens system solving the above problems.

If the lens system according to the invention of the prior application is used as it is for a lens system of the F/4.0 class, due to the restriction of the effective diameter of the first lens component, the peripheral light amount will relatively reduce. Therefore, the effective diameter of the first lens component must be made large. In order to prevent the reduction of the peripheral light amount while retaining the compactness and correcting the spherical aberration, it is considered to make the first lens component a little thicker or to make the refractive index higher to make the radius of curvature larger. the latter way is adopted in the present invention. That is to say, in the invention of the prior application, the refractive index of the first lens component is defined to be 1.45 to 1.63. However, it is found that, if the refractive index is made higher than 1.63, there will be a merit that the effective diameter will be able to be made larger and thereby not only the astigmatic difference but also the off-axial aberrations likely to be difficult to correct will be able to be well corrected by forming other lens components as well balanced and well balancing various aberrations.

SUMMARY OF THE INVENTION

The present invention is made on the basis of the above idea and is to provide a compact lens system of a field angle of view of or more than 60 degrees, F-number of 4.0 and short overall length.

In the present invention, the same as in the invention of the prior application, in order to reduce the overall length, a four-component four-element telephoto type lens system of a small number of lenses is adopted and aspherical surfaces are used for both surfaces of the fourth lens component to make the F-number 4.0 (the F-number is 4.5 in the lens system according to the invention of the prior application) so as to solve the above mentioned problems.

The lens system according to the present invention comprises a first lens component of a positive meniscus lens with the convex surface on the object side, a second lens component of a biconcave lens, a third lens component of a biconvex lens and a fourth lens component of a negative meniscus lens with the concave surface on the object side and satisfies the following respective conditions:

$$0.55f < f_{123} < 0.70f \quad (1)$$

$$0.7f < |f_4| < 1.2f \quad (2)$$

$$1.0f < -r_3 < 3.0f \quad (3)$$

$$0.018f < d_2 < 0.035f \quad (4)$$

$$0.06f < d_5 < 0.15f \quad (5)$$

$$0.1f < d_6 < 0.2f \quad (6)$$

$$0.03f < d_7 < 0.1f \quad (7)$$

$$1.63 < n_1 < 1.76 \quad (8)$$

$$\nu_3 < 58 \quad (9)$$

where the reference symbol f denotes a focal length of the entire system, $f_{123}$ denotes a compound focal length of the first to third lens components, $f_4$ denotes a focal length of the fourth lens component, $r_3$ denotes a radius of curvature of the surface on the object side of the second lens component, $d_5$ and $d_7$ denotes thicknesses respectively of the third lens component and fourth lens component, $d_2$ denotes an air space between the first lens component and second lens component, $d_6$ denotes an air space between the third lens component and fourth lens component, $n_1$ denotes a refractive index of the first lens component and $\nu_3$ denotes an Abbe's number of the third lens component.

Further, in the lens system according to the present invention, both surfaces of the fourth lens component are made aspherical surfaces represented by the formula (10):

$$x_i = \frac{y_i^2}{r_i + r_i\sqrt{1-(y_i/r_i)^2}} + A_iy_i^4 + B_iy_i^6 + C_iy_i^8 + D_iy_i^{10} \quad (10)$$

where the reference symbols $A_i$, $B_i$, $C_i$ and $D_i$ (i=7 or 8) are aspherical coefficients satisfying respectively the following relations:

$$A_7 > -10^2 f^{-3}, \, B_7 > -10^3 f^{-5}, \, C_7 > -10^4 f^{-7},$$
$$D_7 > -10^7 f^{-9}$$

$$A_8 < -10^{-1} f^{-3}, \, B_8 < 10^2 f^{-5}, \, C_8 < -10^2 f^{-7} \text{ and}$$

$$D_8 < 10^6 f^{-9}.$$

The above mentioned respective conditions shall be explained in the following.

The conditions (1) and (2) define the compound focal length of the first lens component through the third lens component forming a front lens group which is of a convergent lens system and the focal length $f_4$ of the fourth lens component forming a rear lens group which is of a divergent lens system. In order to correct the respective aberrations as well balanced, it is preferable that both $f_{123}$ and $|f_4|$ are large. However, if they are so large as to exceed the upper limits of the respective conditions, the telephoto ratio will not be able to be made small. Also, if the lower limits are exceeded, it will be difficult to correct various aberration as well balanced.

The condition (3) defines the radius of curvature $r_3$ of the surface on the objective side of the second lens component. This surface becomes a surface of a negative radius of curvature as required by correcting the spherical aberration and on-axial chromatic aberration generated in the first lens component, therefore the entrance angle of the off-axial light entering this surface becomes larger and the astigmatism, coma and chromatic coma of the peripheral part of the field angle of view deteriorate. Therefore, when the lower limit of this condition is exceeded, the above mentioned respective aberrations will be no longer able to be well corrected by the other lens components. It is not desirable. Also, when the upper limit is exceeded, a bobbin-shaped distortion will be generated and the spherical aberration and on-axial chromatic aberration will be under-corrected. It is not desirable.

The condition (4) defines the air space $d_2$ between the first lens component and second lens component. In order to make the spherical aberration and on-axial chromatic aberration favorable, $d_2$ had better be small and $r_3$ can be made that much a little larger. It is desirable also for the correction of the off-axial aberration. However, when the lower limit is exceeded, a sufficient effective diameter will be no longer able to be taken. It is not desirable. Also, when the upper limit is exceeded, it will not be desirable to the correction of the respective aberrations.

The condition (5) defines the thickness $d_5$ of the third lens component. In the lens system according to the present invention, with also the use of a glass material high in the refractive index for the first lens component, an astigmatic difference is so likely to be generated that it is desirable to make $d_5$ large. Therefore, as long as the overall length is not prevented from being made short, $d_5$ had better be made large. That is to say, the upper limit is to keep the overall length short. When it is exceeded, it will not be desirable to making the overall length short. Further, when the lower limit is exceeded, the astigmatic difference will be no longer able to be well corrected.

The condition (6) relates to the air space $d_6$ between the third lens component and fourth lens component. In reducing the telephoto ratio, it is effective that the overall length of the lens system is not made so long but the back focus is made shorter. Therefore, in the lens system according to the present invention of the telephoto type, it is desirable to separate the main point position of the front lens group and the principal point position of the rear lens group from each other as long as the overall length is not prevented from being made short and therefore $d_6$ had better be large. However, if the upper limit is exceeded, the overall length will become longer. It is not desirable. Also, if the lower limit is exceeded, the back focus will become long. If it is to be forcibly contracted, $f_{123}$ and $|f_4|$ will become so small as to be undesirable to correct the aberrations as well balanced.

The condition (7) defines the thickness $d_7$ of the fourth lens component. When $d_7$ is made small, it will be advantageous to correcting the astigmatic difference but, if the lower limit is exceeded, the thickness will reduce. It is not desirable to the strength. If the upper limit is exceeded, it will be difficult to correct the astigmatic difference.

The condition (8) is a feature of the lens system according to the present invention as compared with the lens system according to the invention of the above described prior application. When the lower limit of this condition is exceeded, the radius of curvature of the first lens component will become small due to the necessity of making $f_{123}$ small to some extent, the effective diameters of the first lens component and second lens component will not be able to be well taken, the peripheral light amount will reduce and the aperture ratio will be no longer able to be made F/4. When the upper limit is exceeded, it will be difficult to correct the astigmatic difference even with the other lens components.

The condition (9) defines the Abbe's number $\nu_3$ of the third lens component. The second lens component will become low in the Abbe's number in correcting the on-axial chromatic aberration but the short wave length light of the peripheral part of the field angle of view in which the entrance angle to the second lens component will become large therefore will be over-corrected. In order to prevent it, it is necessary to make the Abbe's number $\nu_3$ of the third lens component less than 58.0. Therefore, when the upper limit is exceeded, even if the chromatic aberration of the magnification is well balanced in the intermediate part of the field angle of view, the chromatic aberration of the magnification will not be able to be well balanced in the peripheral part of the field angle of view.

The off-axial aberration which will not be able to be well corrected in the spherical system even if the lens system is so formed as to satisfy the conditions (1) through (9) as in the above is corrected by using the aspherical surface represented by the formula (10) according to the present invention for the fourth lens component. In the lens system of such formation as in the lens system according to the present invention, a bobbin-shaped distortion is likely to be generated by the rear lens group. There is a property that, if it is to be corrected by the front lens group, the aberrations or particularly the coma and distortion of the peripheral part of the field angle of view will not be able to be well corrected and will be unbalanced. In order to remove the distortion, $|r_3|$ becomes small. However, in order to correct the coma flare generated by it and to correct the distortion which can not be perfectly corrected, it is desirable to make the surface on the image side of the fourth component lens an aspherical surface deviated to the object side from the reference surface so as to weaken the upward refracting force of the off-axial light without varying the power near the optical axis of the lens by using an aspherical surface for the fourth component lens. Further, the surface on the object side of the fourth lens component is sufficiently lower in the effectiveness to the aberration in the peripheral part of the field angle of view than the surface on the image side but will show the same effectiveness as of the surface on the image side as the axis is approached and will be rather more effective to the aberrations of the on-axial light. The surface on the object side of the fourth lens component had better be deviated a little to the object side in order to solve the under-correction of the aberrations of the light near the on-axial light but, if the deviation is too large, the aberrations will become hard to balance with the aberrations of the peripheral part of the field angle of view. Therefore, the respective coefficients are provided with lower limit values.

DESCRIPTION OF THE PREFERRED EMBODIMENTS

Figure 1:
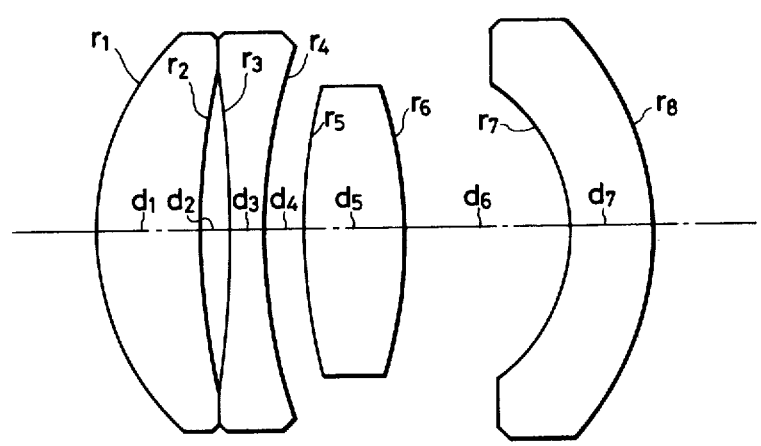
FIG. 1 is a sectional view of the lens system according to the present invention.

Preferred embodiments of the lens system according to the present invention explained in the above are as shown below:

Embodiment 1
$f = 100$  $2\omega = 63°$  F-number = 4.0
$r_1 = 25.9559$
  $d_1 = 8.2856$  $n_1 = 1.67790$  $\nu_1 = 55.33$
$r_2 = 81.9207$
  $d_2 = 2.2857$
$r_3 = -159.8784$
  $d_3 = 6.0441$  $n_2 = 1.84666$  $\nu_2 = 23.88$
$r_4 = 49.6331$
  $d_4 = 2.5089$
$r_5 = 63.9734$
  $d_5 = 11.3703$  $n_3 = 1.69895$  $\nu_3 = 30.12$
$r_6 = -74.5690$
  $d_6 = 14.7902$
$r_7 = -18.8537$
  $d_7 = 5.8039$  $n_4 = 1.53172$  $\nu_4 = 48.90$
$r_8 = -35.4535$
$A_7 = -0.14307 \times 10^{-4}$    $A_8 = -0.89153 \times 10^{-5}$
$B_7 = -0.26326 \times 10^{-7}$    $B_8 = +0.26030 \times 10^{-8}$
$C_7 = -0.31235 \times 10^{-10}$   $C_8 = -0.42677 \times 10^{-10}$
$D_7 = -0.13391 \times 10^{-11}$   $D_8 = +0.21422 \times 10^{-13}$
$f_{123} = 61.0$  $f_4 = -86.2$  Telephoto Ratio = 0.969

Embodiment 2
$f = 100$  $2\omega = 63°$  F-number = 4.0
$r_1 = 26.1846$
  $d_1 = 9.9946$  $n_1 = 1.65830$  $\nu_1 = 57.33$
$r_2 = 73.2040$
  $d_2 = 2.8371$
$r_3 = -153.5466$
  $d_3 = 3.1983$  $n_2 = 1.80518$  $\nu_2 = 25.43$
$r_4 = 62.2243$
  $d_4 = 3.8006$
$r_5 = 62.2966$
  $d_5 = 8.5829$  $n_3 = 1.58144$  $\nu_3 = 40.75$
$r_6 = -77.7617$
  $d_6 = 15.8400$
$r_7 = -15.1909$
  $d_7 = 6.3074$  $n_4 = 1.49109$  $\nu_4 = 57.00$
$r_8 = -24.4789$
$A_7 = -0.61436 \times 10^{-6}$    $A_8 = -0.26880 \times 10^{-5}$
$B_7 = -0.19539 \times 10^{-7}$    $B_8 = -0.46125 \times 10^{-8}$
$C_7 = -0.32520 \times 10^{-10}$   $C_8 = -0.30442 \times 10^{-10}$
$D_7 = -0.25506 \times 10^{-11}$   $D_8 = -0.11168 \times 10^{-12}$
$f_{123} = 63.7$  $f_4 = -105.0$  Telephoto Ratio = 0.959

Embodiment 3
$f = 100$  $2\omega = 63°$  F-number = 4.0
$r_1 = 26.9059$
  $d_1 = 9.7438$  $n_1 = 1.69680$  $\nu_1 = 55.52$
$r_2 = 64.3274$
  $d_2 = 2.3711$
$r_3 = -189.4474$
  $d_3 = 4.4269$  $n_2 = 1.78472$  $\nu_2 = 25.71$
$r_4 = 54.8003$
  $d_4 = 3.6036$
$r_5 = 54.0337$
  $d_5 = 9.9157$  $n_3 = 1.62606$  $\nu_3 = 39.21$
$r_6 = -94.7006$
  $d_6 = 15.4043$
$r_7 = -16.7465$
  $d_7 = 7.5505$  $n_4 = 1.51118$  $\nu_4 = 51.02$ -continued
$r_8 = -27.7948$
$A_7 = -0.53641 \times 10^{-5}$    $A_8 = -0.41879 \times 10^{-5}$
$B_7 = -0.25468 \times 10^{-7}$    $B_8 = +0.18786 \times 10^{-8}$
$C_7 = -0.31215 \times 10^{-10}$   $C_8 = -0.42650 \times 10^{-10}$
$D_7 = -0.13379 \times 10^{-11}$   $D_8 = +0.21403 \times 10^{-13}$
$f_{123} = 63.5$  $f_4 = -107.2$  Telephoto Ratio = 0.982

Embodiment 4
$f = 100$  $2\omega = 63°$  F-number = 4.0
$r_1 = 26.3631$
  $d_1 = 9.7398$  $n_1 = 1.65160$  $\nu_1 = 58.67$
$r_2 = 81.9057$
  $d_2 = 2.3707$
$r_3 = -126.4174$
  $d_3 = 3.4846$  $n_2 = 1.80518$  $\nu_2 = 25.43$
$r_4 = 57.8647$
  $d_4 = 3.7417$
$r_5 = 60.7666$
  $d_5 = 8.9686$  $n_3 = 1.62588$  $\nu_3 = 35.70$
$r_6 = -70.0294$
  $d_6 = 15.9378$
$r_7 = -16.8261$
  $d_7 = 7.5976$  $n_4 = 1.49109$  $\nu_4 = 57.00$
$r_8 = -30.5190$
$A_7 = -0.17484 \times 10^{-5}$    $A_8 = -0.24260 \times 10^{-5}$
$B_7 = -0.26455 \times 10^{-7}$    $B_8 = +0.91479 \times 10^{-9}$
$C_7 = -0.31306 \times 10^{-10}$   $C_8 = -0.42802 \times 10^{-10}$
$D_7 = -0.13429 \times 10^{-11}$   $D_8 = +0.21483 \times 10^{-13}$
$f_{123} = 61.3$  $f_4 = -93.4$  Telephoto Ratio = 0.971

Embodiment 5
$f = 100$  $2\omega = 63°$  F-number = 4.0
$r_1 = 27.1306$
  $d_1 = 8.5401$  $n_1 = 1.72916$  $\nu_1 = 54.68$
$r_2 = 61.0890$
  $d_2 = 2.2857$
$r_3 = -253.2396$
  $d_3 = 6.4866$  $n_2 = 1.84666$  $\nu_2 = 23.88$
$r_4 = 54.3144$
  $d_4 = 3.2002$
$r_5 = 54.1881$
  $d_5 = 11.8266$  $n_3 = 1.66680$  $\nu_3 = 33.04$
$r_6 = -110.1360$
  $d_6 = 15.0908$
$r_7 = -19.2806$
  $d_7 = 4.6697$  $n_4 = 1.53256$  $\nu_4 = 45.91$
$r_8 = -32.4575$
$A_7 = -0.24230 \times 10^{-4}$    $A_8 = -0.15141 \times 10^{-4}$
$B_7 = -0.26146 \times 10^{-7}$    $B_8 = +0.22694 \times 10^{-8}$
$C_7 = -0.31231 \times 10^{-10}$   $C_8 = -0.42686 \times 10^{-10}$
$D_7 = -0.13390 \times 10^{-11}$   $D_8 = +0.21420 \times 10^{-13}$
$f_{123} = 65.2$  $f_4 = -101.7$  Telephoto Ratio = 0.979

Embodiment 6
$f = 100$  $2\omega = 63°$  F-number = 4.0
$r_1 = 27.6535$
  $d_1 = 9.7427$  $n_1 = 1.64000$  $\nu_1 = 60.09$
$r_2 = 89.7825$
  $d_2 = 2.8571$
$r_3 = -138.2979$
  $d_3 = 4.2433$  $n_2 = 1.80518$  $\nu_2 = 25.43$
$r_4 = 77.3393$
  $d_4 = 4.6803$
$r_5 = 85.9732$
  $d_5 = 9.5377$  $n_3 = 1.62606$  $\nu_3 = 39.21$
$r_6 = -76.1224$
  $d_6 = 15.5705$
$r_7 = -20.0695$
  $d_7 = 4.9491$  $n_4 = 1.46450$  $\nu_4 = 65.94$
$r_8 = -39.3516$
$A_7 = -0.19531 \times 10^{-4}$    $A_8 = -0.10729 \times 10^{-4}$
$B_7 = -0.22893 \times 10^{-7}$    $B_8 = -0.17182 \times 10^{-8}$
$C_7 = -0.31238 \times 10^{-10}$   $C_8 = -0.42631 \times 10^{-10}$
$D_7 = -0.13391 \times 10^{-11}$   $D_8 = +0.21423 \times 10^{-13}$
$f_{123} = 64.5$  $f_4 = -96.0$  Telephoto Ratio = 0.968 wherein the reference symbols $r_1$ through $r_8$ denote radii of curvature of the respective surfaces of the lenses, $d_1$ through $d_7$ denote thicknesses of the respective lenses and airspaces therebetween, $n_1$ through $n_4$ denote refractive indices of the respective lenses and $\nu_1$ through $\nu_4$ denote Abbe's numbers of the respective lenses.

Figure 2:
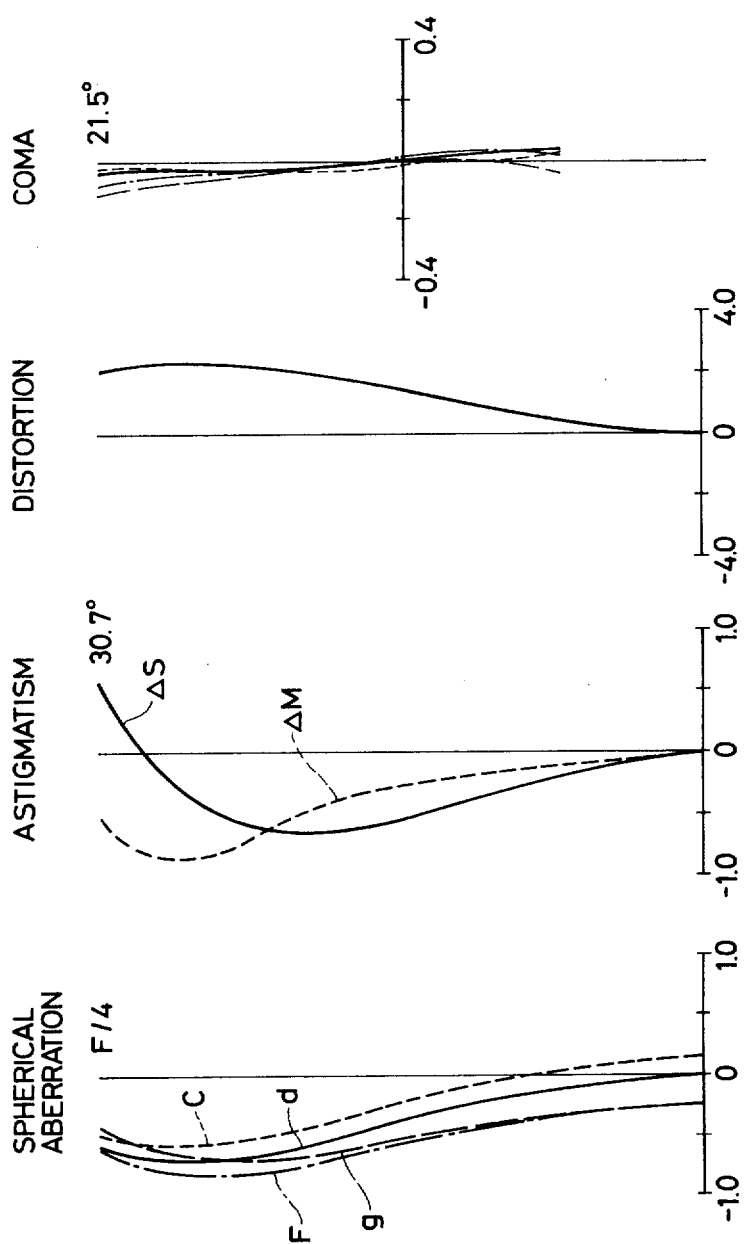
FIGS. 2 through 7 are graphs illustrating aberration curves of Embodiments 1 through 6, respectively.
Figure 3:
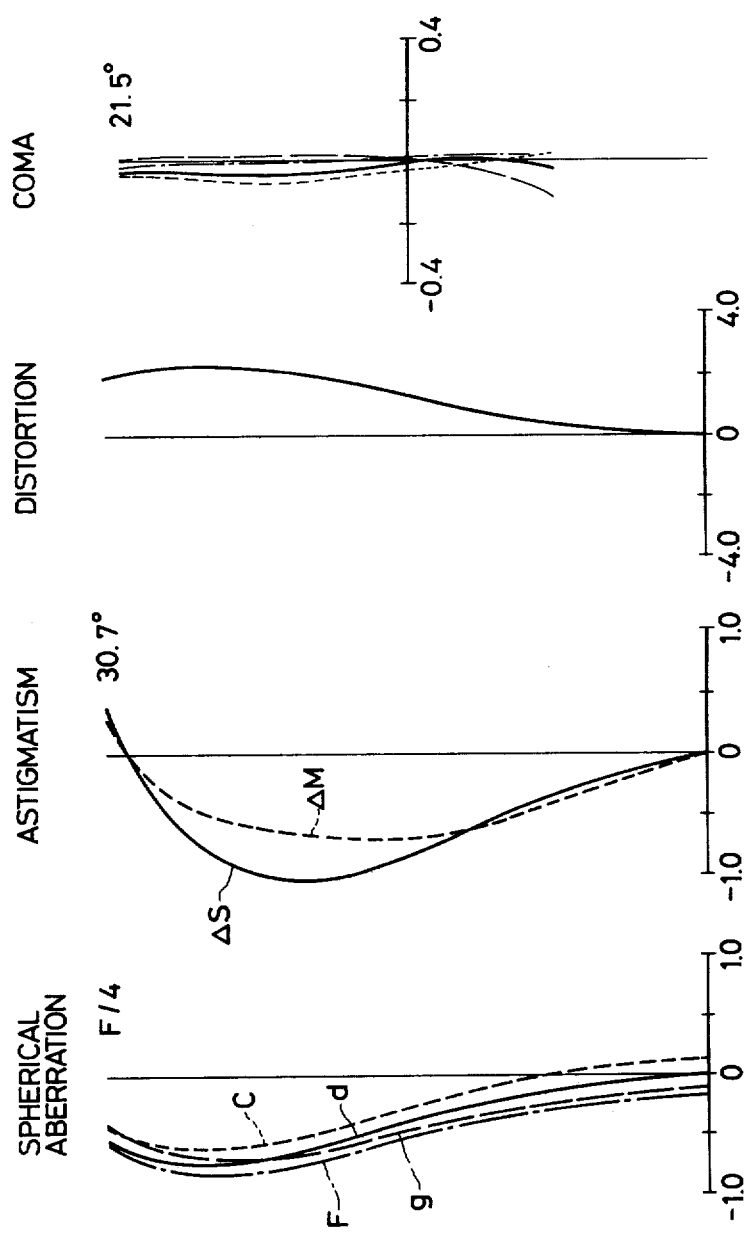
Figure 4:
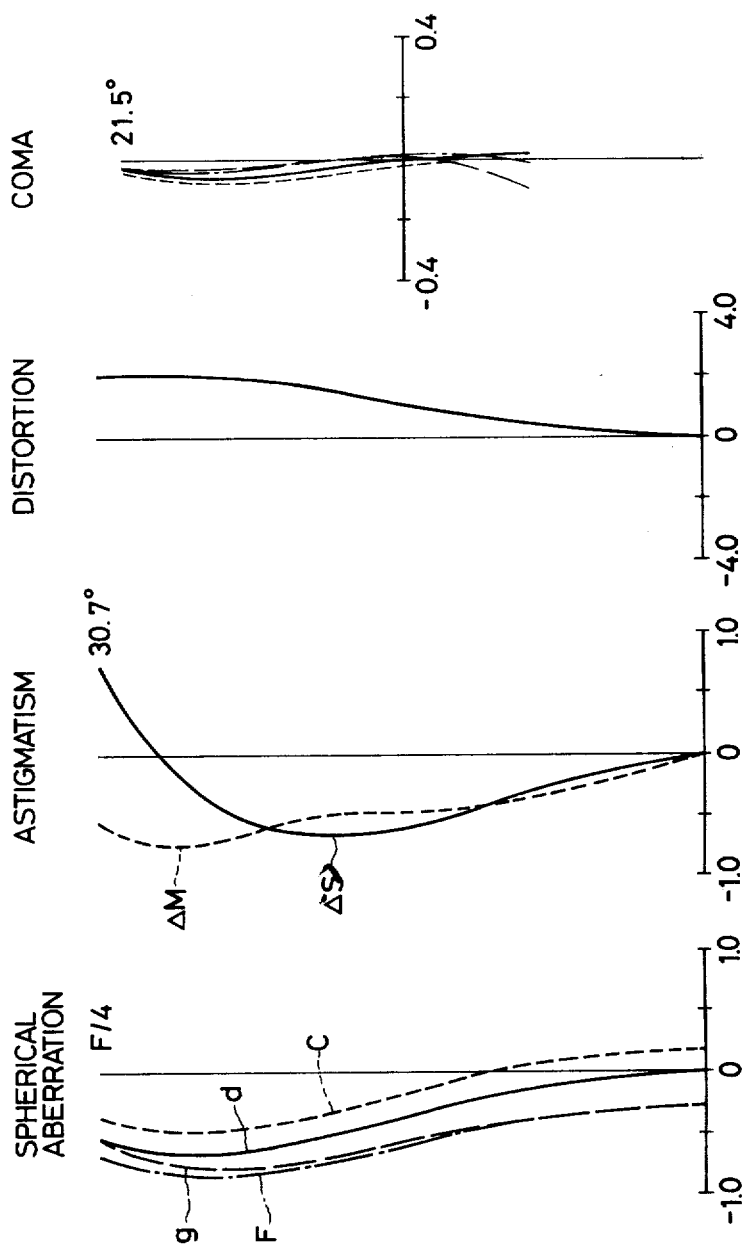
Figure 5:
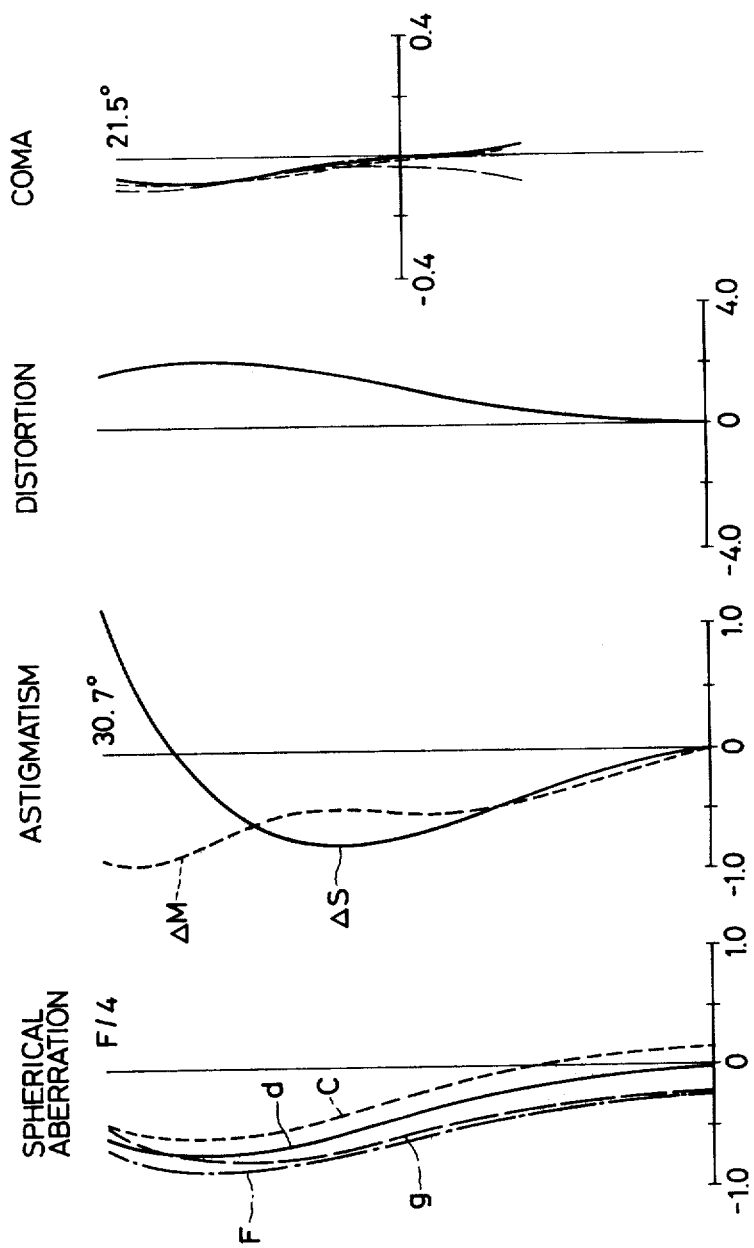
Figure 6:
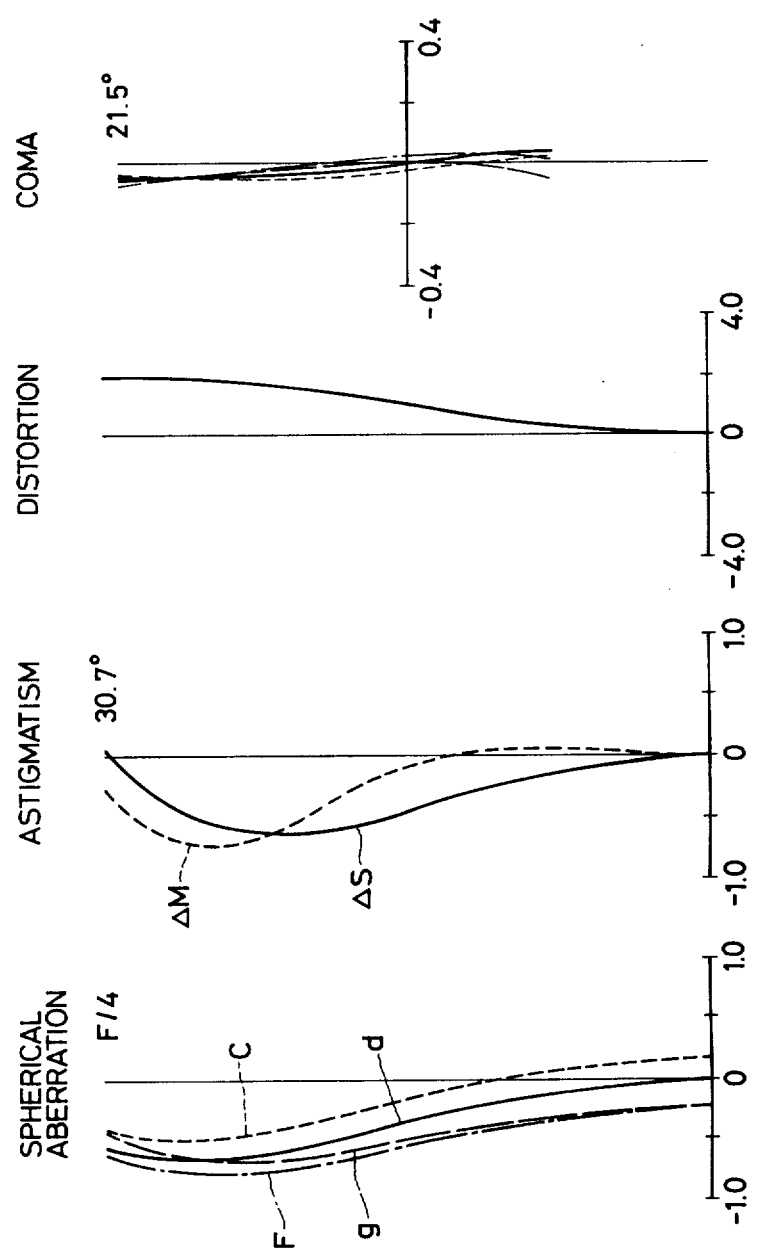
Figure 7:
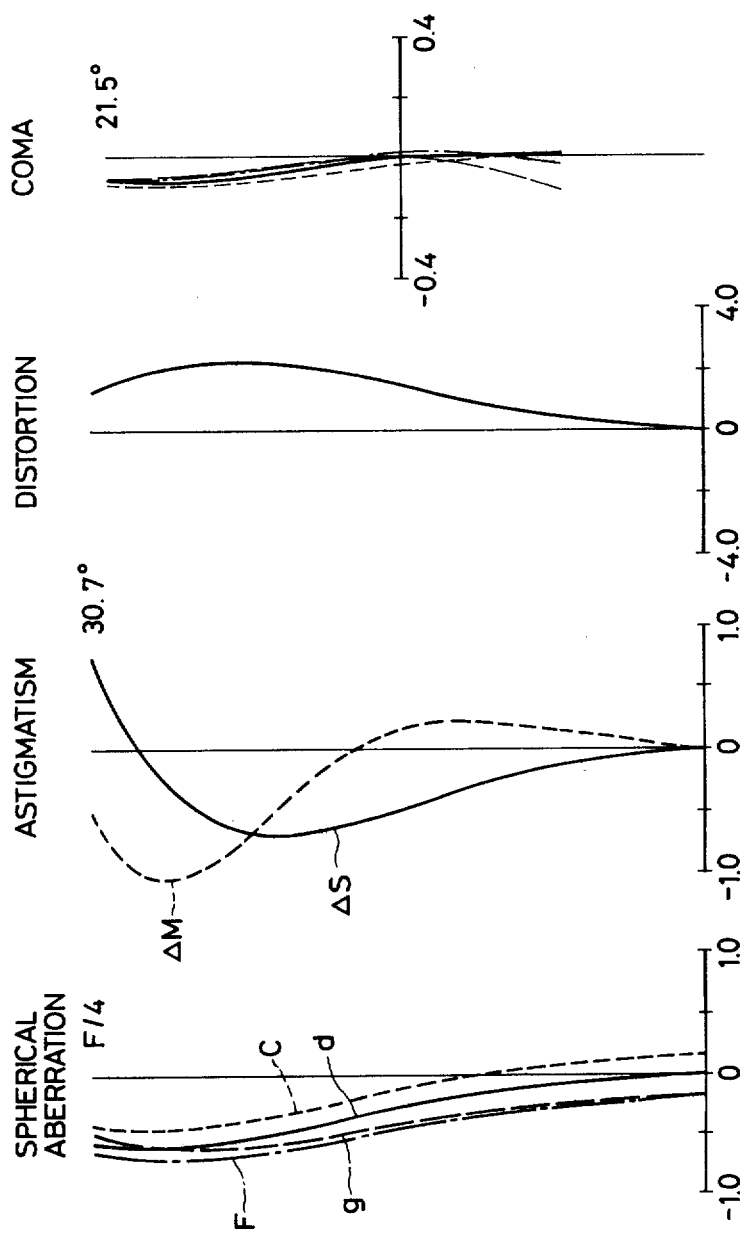

The aberration curves of the above respective embodiments are shown in FIGS. 2 through 7 and are of the aberrations when the object point is placed in such position that the magnification may be 1/75.

I claim:

1. A compact camera lens system with a short overall length comprising a first positive meniscus lens component having the convex surface on the object side, a second biconcave lens component, a third biconvex lens component and a fourth negative meniscus lens component, said lens system satisfying the following conditions (1) through (9) when the focal length of the entire system is represented by f, the composite focal length from said first lens component to said third lens component is represented by $f_{123}$, the focal length of said fourth lens component is represented by $f_4$, the radius of curvature of the surface on the object side of said second lens component is represented by $r_3$, the axial thicknesses of said third and fourth lens component are respectively represented by $d_5$ and $d_7$, the airspaces between said first and second lens component is represented by $d_2$, the airspace between said third and fourth lens components is represented by $d_6$, the refractive index of said first lens component is represented by $n_1$ and the Abbe's number of said third lens component is represented by $\nu_3$, and further both surfaces of said fourth lens component being formed as an aspherical surface expressed by the following formula (10) when the direction of the optical axis is represented by x axis, the direction perpendicular to the optical axis is represented by y axis and the para-axial radii of curvature of both surfaces of said fourth lens component are respectively represented by $r_7$ and $r_8$:

$$0.55f < f_{123} < 0.70f \quad (1)$$

$$0.7f \leq f_4 < 1.2f \quad (2)$$

$$1.0f < -r_3 \, 3.0f \quad (3)$$

$$0.018f > d_2 < 0.035f \quad (4)$$

$$0.06f < d_5 < 0.15f \quad (5)$$

$$0.1f < d_6 < 0.2f \quad (6)$$

$$0.03f < d_7 < 0.1f \quad (7)$$

$$1.63 < n_1 < 1.76 \quad (8)$$

$$\nu_3 < 58 \quad (9)$$

$$x_i = \frac{y_i^2}{r_i + r_i\sqrt{1-(y_i/r_i)^2}} + A_i y_i^4 + B_i y_i^6 + C_i y_i^8 + D_i y_i^{10} \quad (10)$$

wherein reference symbols $A_i$, $B_i$, $C_i$ and $D_i$ (i=7, 8) respectively represent coefficients in the above formula and are of the following values respectively:

$$A_7 > -10^2 f^{-3}, \ B_7 > -10^3 f^{-5}, \ C_7 > -10^4 f^{-7},$$
$$D_7 > -10^7 f^{-9}$$

$$A_8 < -10^{-1} f^{-3}, \ B_8 < 10^2 f^{-5}, \ C_8 < -10^2 f^{-7},$$
$$D_8 > 10^6 f^{-9}.$$

2. A compact camera lens system according to claim 1 having the following numerical data:

| f = 100 | $2\omega = 63°$ | F-number = 4.0 |
|---|---|---|
| $r_1 = 25.9559$ | | |
| $d_1 = 8.2856$ | $n_1 = 1.67790$ | $\nu_1 = 55.33$ |
| $r_2 = 81.9207$ | | |
| $d_2 = 2.2857$ | | |
| $r_3 = -159.8784$ | | |
| $d_3 = 6.0441$ | $n_2 = 1.84666$ | $\nu_2 = 23.88$ |
| $r_4 = 49.6331$ | | |
| $d_4 = 2.5089$ | | |
| $r_5 = 63.9734$ | | |
| $d_5 = 11.3703$ | $n_3 = 1.69895$ | $\nu_3 = 30.12$ |
| $r_6 = -74.5690$ | | |
| $d_6 = 14.7902$ | | |
| $r_7 = -18.8537$ | | |
| $d_7 = 5.8039$ | $n_4 = 1.53172$ | $\nu_4 = 48.90$ |
| $r_8 = -35.4535$ | | |
| $A_7 = -0.14307 \times 10^{-4}$ | | $A_8 = -0.89153 \times 10^{-5}$ |
| $B_7 = -0.26326 \times 10^{-7}$ | | $B_8 = +0.26030 \times 10^{-8}$ |
| $C_7 = -0.31235 \times 10^{-10}$ | | $C_8 = -0.42677 \times 10^{-10}$ |
| $D_7 = -0.13391 \times 10^{-11}$ | | $D_8 = +0.21422 \times 10^{-13}$ |
| $f_{123} = 61.0$ | $f_4 = -86.2$ | Telephoto Ratio = 0.969 | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbols $A_7$, $A_8$, $B_7$, $B_8$, $C_7$, $C_8$, $D_7$ and $D_8$ respectively represent coefficients in the formula (10) of claim 1, reference symbol $f_{123}$ represents the composite focal length from said first lens component to said third lens component, and reference symbol $f_4$ represents the focal length of said fourth lens component.

3. A compact camera lens system according to claim 1 having the following numerical data:

| f = 100 | $2\omega = 63°$ | F-number = 4.0 |
|---|---|---|
| $r_1 = 26.1846$ | | |
| $d_1 = 9.9946$ | $n_1 = 1.65830$ | $\nu_1 = 57.33$ |
| $r_2 = 73.2040$ | | |
| $d_2 = 2.8371$ | | |
| $r_3 = -153.5466$ | | |
| $d_3 = 3.1983$ | $n_2 = 1.80518$ | $\nu_2 = 25.43$ |
| $r_4 = 62.2243$ | | |
| $d_4 = 3.8006$ | | |
| $r_5 = 62.2966$ | | |
| $d_5 = 8.5829$ | $n_3 = 1.58144$ | $\nu_3 = 40.75$ |
| $r_6 = -77.7617$ | | |
| $d_6 = 15.8400$ | | |
| $r_7 = -15.1909$ | | |
| $d_7 = 6.3074$ | $n_4 = 1.49109$ | $\nu_4 = 57.00$ |
| $r_8 = -24.4789$ | | |
| $A_7 = -0.61436 \times 10^{-6}$ | | $A_8 = -0.26880 \times 10^{-5}$ |
| $B_7 = -0.19539 \times 10^{-7}$ | | $B_8 = -0.46125 \times 10^{-8}$ |
| $C_7 = -0.32520 \times 10^{-10}$ | | $C_8 = -0.30442 \times 10^{-10}$ |
| $D_7 = -0.25506 \times 10^{-11}$ | | $D_8 = -0.11168 \times 10^{-12}$ |
| $f_{123} = 63.7$ | $f_4 = -105.0$ | Telephoto Ratio = 0.959 | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbols $A_7$, $A_8$, $B_7$, $B_8$, $C_7$, $C_8$, $D_7$ and $D_8$ respectively represent coefficients in the formula (10) of claim 1, reference symbol $f_{123}$ represents the composite focal length from said first lens component to said third lens component, and reference symbol $f_4$ represents the focal length of said fourth lens component.

4. A compact camera lens system according to claim 1 having the following numerical data:

| f = 100 | 2ω = 63° | F-number = 4.0 | |
|---|---|---|---|
| $r_1 = 26.9059$ | | | |
| | $d_1 = 9.7438$ | $n_1 = 1.69680$ | $\nu_1 = 55.52$ |
| $r_2 = 64.3274$ | | | |
| | $d_2 = 2.3711$ | | |
| $r_3 = -189.4474$ | | | |
| | $d_3 = 4.4269$ | $n_2 = 1.78472$ | $\nu_2 = 25.71$ |
| $r_4 = 54.8003$ | | | |
| | $d_4 = 3.6036$ | | |
| $r_5 = 54.0337$ | | | |
| | $d_5 = 9.9157$ | $n_3 = 1.62606$ | $\nu_3 = 39.21$ |
| $r_6 = -94.7006$ | | | |
| | $d_6 = 15.4043$ | | |
| $r_7 = -16.7465$ | | | |
| | $d_7 = 7.5505$ | $n_4 = 1.51118$ | $\nu_4 = 51.02$ |
| $r_8 = -27.7948$ | | | |
| $A_7 = -0.53641 \times 10^{-5}$ | | $A_8 = -0.41879 \times 10^{-5}$ | |
| $B_7 = -0.25468 \times 10^{-7}$ | | $B_8 = +0.18786 \times 10^{-8}$ | |
| $C_7 = -0.31215 \times 10^{-10}$ | | $C_8 = -0.42650 \times 10^{-10}$ | |
| $D_7 = -0.13379 \times 10^{-11}$ | | $D_8 = +0.21403 \times 10^{-13}$ | |
| $f_{123} = 63.5$ | $f_4 = -107.2$ | Telephoto Ratio = 0.982 | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbols $A_7$, $A_8$, $B_7$, $B_8$, $C_7$, $C_8$, $D_7$ and $D_8$ respectively represent coefficients in the formula (10) of claim 1, reference symbol $f_{123}$ represents the composite focal length from said first lens component to said third lens component, and reference symbol $f_4$ represents the focal length of said fourth lens component.

5. A compact camera lens system according to claim 1 having the following numerical data:

| f = 100 | 2ω = 63° | F-number = 4.0 | |
|---|---|---|---|
| $r_1 = 26.3631$ | | | |
| | $d_1 = 9.7398$ | $n_1 = 1.65160$ | $\nu_1 = 58.67$ |
| $r_2 = 81.9057$ | | | |
| | $d_2 = 2.3707$ | | |
| $r_3 = -126.4174$ | | | |
| | $d_3 = 3.4846$ | $n_2 = 1.80518$ | $\nu_2 = 25.43$ |
| $r_4 = 57.8647$ | | | |
| | $d_4 = 3.7417$ | | |
| $r_5 = 60.7666$ | | | |
| | $d_5 = 8.9686$ | $n_2 = 1.62588$ | $\nu_3 = 35.70$ |
| $r_6 = -70.0294$ | | | |
| | $d_6 = 15.9378$ | | |
| $r_7 = -16.8261$ | | | |
| | $d_7 = 7.5976$ | $n_4 = 1.49109$ | $\nu_4 = 57.00$ |
| $r_8 = -30.5190$ | | | |
| $A_7 = -0.17484 \times 10^{-5}$ | | $A_8 = -0.24260 \times 10^{-5}$ | |
| $B_7 = -0.26455 \times 10^{-7}$ | | $B_8 = +0.91479 \times 10^{-9}$ | |
| $C_7 = -0.31306 \times 10^{-10}$ | | $C_8 = -0.42802 \times 10^{-10}$ | |
| $D_7 = -0.13429 \times 10^{-11}$ | | $D_8 = +0.21483 \times 10^{-13}$ | |
| $f_{123} = 61.3$ | $f_4 = -93.4$ | Telephoto Ratio = 0.971 | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbols $A_7$, $A_8$, $B_7$, $B_8$, $C_7$, $C_8$, $D_7$ and $D_8$ respectively represent coefficients in the formula (10) of claim 1, reference symbol $f_{123}$ represents the composite focal length from said first lens component to said third lens component, and reference symbol $f_4$ represents the focal length of said fourth lens component.

6. A compact camera lens system according to claim 1 having the following numerical data:

| f = 100 | 2ω = 63° | F-number = 4.0 | |
|---|---|---|---|
| $r_1 = 27.1306$ | | | |
| | $d_1 = 8.5401$ | $n_1 = 1.72916$ | $\nu_1 = 54.68$ |
| $r_2 = 61.0890$ | | | |
| | $d_2 = 2.2857$ | | |
| $r_3 = -253.2396$ | | | |
| | $d_3 = 6.4866$ | $n_2 = 1.84666$ | $\nu_2 = 23.88$ |
| $r_4 = 54.3144$ | | | |
| | $d_4 = 3.2002$ | | |
| $r_5 = 54.1881$ | | | |
| | $d_5 = 11.8266$ | $n_3 = 1.66680$ | $\nu_3 = 33.04$ |
| $r_6 = -110.1360$ | | | |
| | $d_6 = 15.0908$ | | |
| $r_7 = -19.2806$ | | | |
| | $d_7 = 4.6697$ | $n_4 = 1.53256$ | $\nu_4 = 45.91$ |
| $r_8 = -32.4575$ | | | |
| $A_7 = -0.24230 \times 10^{-4}$ | | $A_8 = -0.15141 \times 10^{-4}$ | |
| $B_7 = -0.26146 \times 10^{-7}$ | | $B_8 = +0.22694 \times 10^{-8}$ | |
| $C_7 = -0.31231 \times 10^{-10}$ | | $C_8 = -0.42686 \times 10^{-10}$ | |
| $D_7 = -0.13390 \times 10^{-11}$ | | $D_8 = +0.21420 \times 10^{-13}$ | |
| $f_{123} = 65.2$ | $f_4 = -101.7$ | Telephoto Ratio = 0.979 | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbols $A_7$, $A_8$, $B_7$, $B_8$, $C_7$, $C_8$, $D_7$ and $D_8$ respectively represent coefficients in the formula (10) of claim 1, reference symbol $f_{123}$ represents the composite focal length from said first lens component to said third lens component, and reference symbol $f_4$ represents the focal length of said fourth lens component.

7. A compact camera lens system according to claim 1 having the following numerical data:

| f = 100 | 2ω = 63° | F-number = 4.0 | |
|---|---|---|---|
| $r_1 = 27.6535$ | | | |
| | $d_1 = 9.7427$ | $n_1 = 1.64000$ | $\nu_1 = 60.09$ |
| $r_2 = 89.7825$ | | | |
| | $d_2 = 2.8571$ | | |
| $r_3 = -138.2979$ | | | |
| | $d_3 = 4.2433$ | $n_2 = 1.80518$ | $\nu_2 = 25.43$ |
| $r_4 = 77.3393$ | | | |
| | $d_4 = 4.6803$ | | |
| $r_5 = 85.9732$ | | | |
| | $d_5 = 9.5377$ | $n_3 = 1.62606$ | $\nu_3 = 39.21$ |
| $r_6 = -76.1224$ | | | |
| | $d_6 = 15.5705$ | | |
| $r_7 = -20.0695$ | | | |
| | $d_7 = 4.9491$ | $n_4 = 1.46450$ | $\nu_4 = 65.94$ |
| $r_8 = -39.3516$ | | | |
| $A_7 = -0.19531 \times 10^{-4}$ | | $A_8 = -0.10729 \times 10^{-4}$ | |
| $B_7 = -0.22893 \times 10^{-7}$ | | $B_8 = -0.17182 \times 10^{-8}$ | |
| $C_7 = -0.31238 \times 10^{-10}$ | | $C_8 = -0.42631 \times 10^{-10}$ | |
| $D_7 = -0.13391 \times 10^{-11}$ | | $D_8 = +0.21423 \times 10^{-13}$ | |
| $f_{123} = 64.5$ | $f_4 = -96.0$ | Telephoto Ratio = 0.968 | | wherein reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$ through $n_4$ respectively represent refractive indices of respective lenses, reference symbols $\nu_1$ through $\nu_4$ respectively represent Abbe's numbers of respective lenses, reference symbols $A_7$, $A_8$, $B_7$, $B_8$, $C_7$, $C_8$, $D_7$ and $D_8$ respectively represent coefficients in the formula (10) of claim 1, reference symbol $f_{123}$ represents the composite focal length from said first lens component to said third lens component, and reference symbol $f_4$ represents the focal length of said fourth lens component.

* * * * *